Aug. 28, 1923.  1,466,429
C. FLICK
PORK HOLDING AND SPLITTING DEVICE
Filed May 22, 1922   3 Sheets-Sheet 1
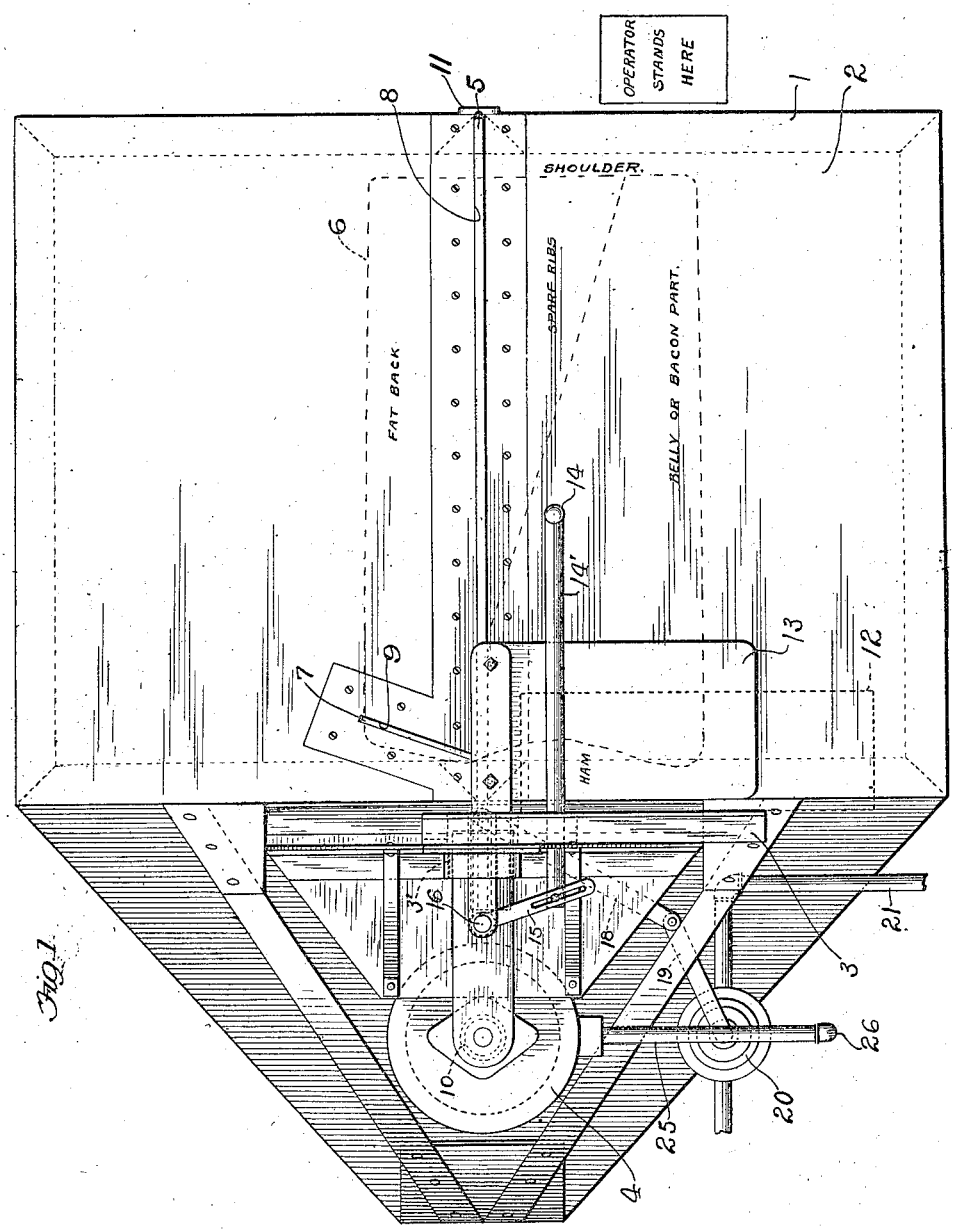
Witness
Martin H. Olsen
Inventor
Clarence Flick,
By Rummler & Rummler, Attys

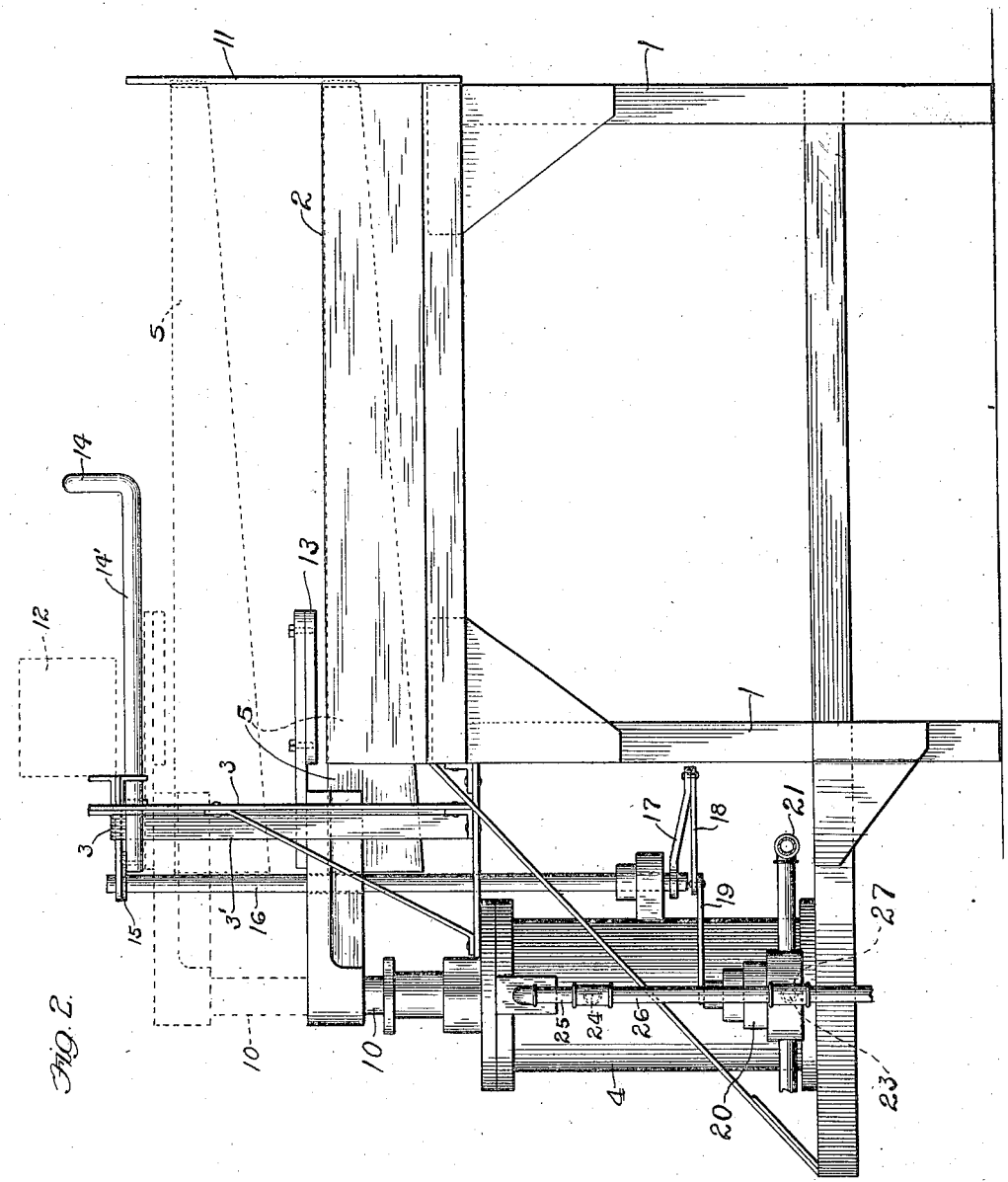

Aug. 28, 1923.
C. FLICK
1,466,429
PORK HOLDING AND SPLITTING DEVICE
Filed May 22, 1922  3 Sheets-Sheet 3
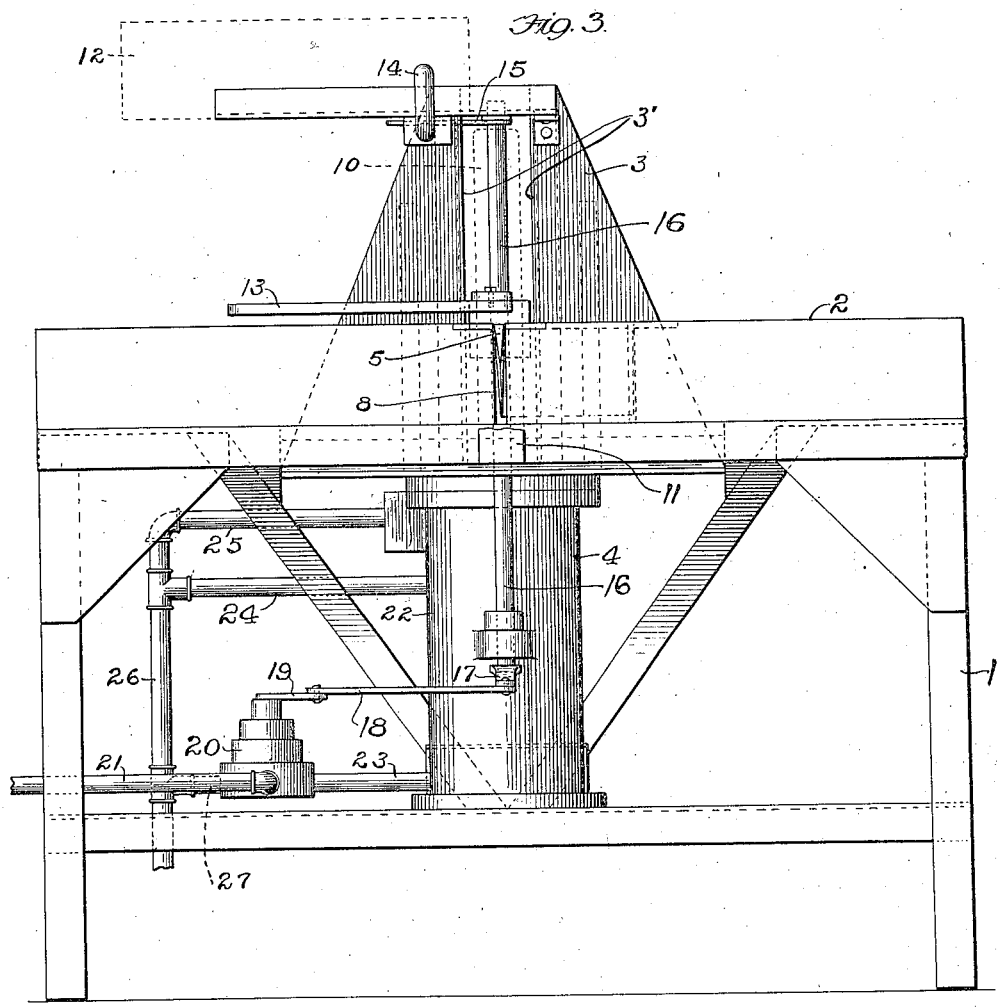
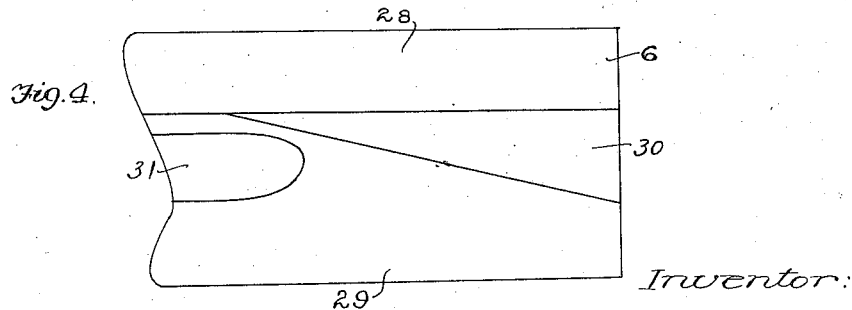
Inventor:
CLARENCE FLICK Patented Aug. 28, 1923.

1,466,429

UNITED STATES PATENT OFFICE.

CLARENCE FLICK, OF EAST ST. LOUIS, ILLINOIS, ASSIGNOR TO SWIFT & COMPANY, OF CHICAGO, ILLINOIS, A CORPORATION OF ILLINOIS.

PORK HOLDING AND SPLITTING DEVICE.

Application filed May 22, 1922. Serial No. 562,807.

*To all whom it may concern:*

Be it known that I, CLARENCE FLICK, a citizen of the United States of America, and a resident of East St. Louis, Illinois, have invented a new and useful Improvement in Pork Holding and Splitting Devices, of which the following is a specification.

This invention relates to methods and means for handling and cutting or splitting the dressed carcasses of hogs and other animals, or sides thereof, as may be required in connection with certain operations in butchering and packing establishments, and especially to means for holding and splitting sides of pork as in separating the fat back from the bacon or belly part of the side.

The main objects of the invention are to provide means of the character stated adapted to save labor and to enhance the appearance of the product; to provide for cutting a straight edge on the belly and fat back, instead of the curved cut as usually made by hand; to provide automatic means to flatten out the flank of the belly so as to facilitate the work of the trimmer; to provide a machine of improved form and method of use, adapted for power operation, subject to manual control, for holding the side, especially of pork, and for splitting the fat middle part of the back away from the rest of the side; to provide such a machine adapted to hold the belly part while the spare rib part is removed; to provide means of this character having a downwardly vise part adapted to press firmly upon and securely grip the carcass side as the knife descends in the cutting operation; to provide fluid pressure means, preferably pneumatic, for operating and controlling such a device; and to provide such a machine adapted for ready operation and control by a single operative.

An illustrative embodiment of this invention is shown in the accompanying drawings in which:

Fig. 1 is a plan of the machine with the fluid pressure pipe connections broken away and with the water box removed and its position indicated by dotted lines.

Fig. 2 is a front elevation of the machine as viewed from the right or near side of Fig. 1.

Fig. 3 is an end view of the machine as viewed from the right of Fig. 2.

Fig. 4 is a plan of a side of the dressed carcass as it appears when laid upon the table of the machine ready for splitting.

In the construction shown in the drawings the machine comprises a frame 1 supporting a thick wooden table part 2 adapted to receive the side to be cut, an upright head frame 3, on which is mounted a fluid operated pneumatic cylinder and operating piston mechanism 4, and on which is also mounted a vertically operating knife 5, as will be more fully explained.

The table top 2 receives the pork side 6 to be cut, as indicated by dotted lines in Fig. 1. Here, the side to be split and trimmed includes the fat back, spare-ribs, and belly or bacon part, the shoulder and ham having been previously removed.

The knife 5 is provided with a short spur blade 7 for trimming the ham end of the fat back, as the splitting knife 5 descends, so as to make a neat and uniform product.

The knife 5 and branch 7 operate vertically to enter corresponding grooves 8 and 9 respectively in the table block 2. In order to provide for this operation, one end of the knife 5 is secured rigidly to the upper end of the piston rod 10, which is subject to the cylinder and piston means 4. The opposite end of knife 5 travels in or upon a guide 11.

The uprights 3' of the head frame 3 serve to steady and guide the piston end of the knife. Said head frame also supports a hot water box 12 in which the operator may dip his trimming knife, or leave the latter when not in immediate use, to keep it in good working condition.

In order to hold the remainder of the side securely for further trimming after the fat back has been split off, the main moving member of the machine includes a vise plate or clamping member 13, disposed horizontally beside the knife 5 and adjacent to the upper part thereof, so as to engage the belly portion until the clamp is released for restoring the knife 5 and member 13 to their normal elevated position, ready for the next unit to be treated.

Manual control of the knife 5 and vise 13 is effected by means of handle 14 on the bar 14', which coacts with lever 15 keyed to the vertical shaft 16 which in turn is connected by arm 17, link 18 and arm 19 to the fluid power control valve 20 on the lower part of the machine. Movement of arm 19 in one direction turns the valve to operate the piston upwardly and vice versa.

Air is supplied to the valve 20 through the pipe 21 and said valve communicates with the cylinder 22 through the pipes 23, 24, 25, 26 and 27, whereby the piston actuated rod 10 is moved up and down to operate the splitting and trimming knife 5—7.

The operation of the device is as follows: The operator, facing the machine (see Fig. 1), places the carcass sides 6 one at a time in position substantially as shown, as they are fed onto the table 2 from the left of the operator.

When the side is properly positioned, that is to say, with the extra short rib under the knife so that the fat back will be cut off leaving the proper "scribe" on the belly, the operator pulls the handle 14, thus turning the valve lever 19 counter-clockwise as viewed in Fig. 1. This releases the air under the piston and admits air under pressure above, thereby forcing the knife 5—7 down upon the side 6. This splits off the fat back and trims the ham end thereof and severs the extra short rib. As the knife reaches its lowermost position the clamp or vise plate 13 engages the underlying ham or flank end of the belly or bacon part which may then be trimmed readily by hand as it is clamped tightly against the table.

When the side is held thus the attendant inserts his draw knife and readily removes the spare rib from the belly. The operator then pushes the handle 14 back, thereby turning the lever 19 clockwise and reversing the valve 20 and causing air to lift the knife and vise member. The side parts are then disposed of to the operator's right. Then the next side is handled in the same way, and so on.

Referring to Fig. 4 which shows a dressed pork side the several parts are indicated by numerals as follows: the fat back 28, the belly 29, the spare rib part 30 and the loin 31. The loin may well be removed before the side reaches this machine.

This machine obviates the need of a man to "split extras;" it makes a straighter cut on the belly and fat back instead of the curved cut generally made by hand; and it flattens out the flank of the belly, thereby saving time for the trimmer. The straight cut made by the machine knife also saves some belly meat that would otherwise go into trimmings.

In order to insure the best results the sides are first chilled before treating on the said machine.

Although but one embodiment of means for carrying out this invention has been herein shown and described, it is to be understood that means of modified form may be used and that some of the steps above described may be altered or omitted and some of the details of the construction shown may also be altered or omitted, without departing from the spirit of this invention as defined by the following claims.

I claim:

1. A machine of the character described including a table to receive in succession the sides to be treated, in combination with a power actuated knife and vise adapted and arranged to cleave away the fat back and to hold the belly or bacon part securely for manual trimming.

2. A machine of the character described including a table to receive in succession the sides to be treated, in combination with a power actuated knife arranged to cleave away the fat back and a vise adapted to hold the belly or bacon part securely for manual trimming, said vise being substantially unitary with said knife and being movable therewith.

Signed at East St. Louis this 16th day of May 1922.

CLARENCE FLICK.